(12) United States Patent
Serkh et al.

(10) Patent No.: US 6,579,199 B2
(45) Date of Patent: Jun. 17, 2003

(54) LINEAR TENSIONER

(75) Inventors: Alexander Serkh, Troy, MI (US); Ali Kanberoglu, Farmington, MI (US)

(73) Assignee: The Gates Corporation, Denver, CO (US)

(*) Notice: Subject to any disclaimer, the term of this patent is extended or adjusted under 35 U.S.C. 154(b) by 58 days.

(21) Appl. No.: 09/944,927

(22) Filed: Aug. 31, 2001

(65) Prior Publication Data

US 2003/0045386 A1 Mar. 6, 2003

(51) Int. Cl.$^7$ ............... F16H 7/12; F16H 7/14
(52) U.S. Cl. ............ 474/135; 474/138; 474/133; 474/117
(58) Field of Search .............. 474/135, 136, 474/138, 101, 114, 113, 117, 133

(56) References Cited

U.S. PATENT DOCUMENTS

| 4,298,342 A | 11/1981 | Clayton et al. | 474/110 |
| 5,273,494 A | 12/1993 | Varin | 474/110 |
| 5,895,332 A | * 4/1999 | Olson et al. | 474/113 |
| 5,938,551 A | 8/1999 | Warner | 474/111 |
| 6,039,664 A | 3/2000 | Schmid | 474/135 |
| 6,450,907 B1 | * 9/2002 | Serkh | 474/138 |

FOREIGN PATENT DOCUMENTS

| GB | 721768 A | * 1/1955 | 474/138 |
| GB | 2090938 A | * 7/1982 | 474/135 |
| IT | 494012 A | * 5/1954 | 474/136 |

* cited by examiner

*Primary Examiner*—Marcus Charles
(74) *Attorney, Agent, or Firm*—J. A. Thurnau, Esq.; C. H. Castleman, Esq.; S. G. Austin, Esq.

(57) ABSTRACT

A tensioner having a pulley journaled to a housing. The housing further comprises a guide. The guide slidingly engages rails on a base. The guide and rails constrain the housing to move in a predetermined linear path. The rails are horizontally offset from two axis defined by the pulley. The pulley load is also vertically offset from the axis of movement of the guide. The guide and rails have a predetermined frictional coefficient so that the cumulative result is an asymmetric damping effect. Further, a linkage is connected between the housing and a camming body. The camming body is rotatably connected to the base. A biasing member such as a torsion spring biases the camming body against the belt load through the linkage. The radius of the camming body is variable to maintain a constant belt load as the tensioner pulley moves in response to a load change.

9 Claims, 2 Drawing Sheets

LINEAR TENSIONER

FIELD OF THE INVENTION

The invention relates to tensioners, and more particularly, to tensioners having a constant tension for a range of linear movement.

BACKGROUND OF THE INVENTION

Most engines used for automobiles and the like include a number of belt driven accessory systems which are necessary for the proper operation of the engine. The accessory systems may include an alternator, air conditioner compressor and a power steering pump.

The accessory systems are generally mounted on a front surface of the engine. Each accessory having a pulley mounted on a shaft for receiving power from some form of belt drive. In early systems, each accessory was driven by a dedicated belt that ran between the accessory and the crankshaft. With improvements in belt technology, single serpentine belts are now used in most applications, routed among the various accessory components. The serpentine belt is driven by the engine crankshaft.

Since the serpentine belt must be routed to all accessories, it has generally become longer than its predecessors. To operate properly, the belt is installed with a pre-determined tension. As it operates, it stretches slightly. This results in a decrease in belt tension, which may cause the belt to slip, causing undue noise and wear. Consequently, a belt tensioner is desirable to maintain the proper belt tension as the belt stretches during use.

As a belt tensioner operates, the belt usually oscillates due to its interaction with the pulleys. These oscillations are undesirable, as they cause premature wear of the belt and tensioner. Therefore, a damping mechanism is added to the tensioner to damp the belt oscillations.

The prior art tensioners rely on some sort of loading element to operate on a pulley. These comprise compression springs, shock absorbers, air springs, hydraulic cylinders, and so on. In this case the belt tension and consequently the load on the pulley is a function of its position. Generally, the tension in the belt increases or decreases depending on the position of the pulley.

In addition, various prior art damping mechanisms have been developed. They include viscous fluid based dampers, mechanisms based on frictional surfaces sliding or interaction with each other, and dampers using a series of interacting springs. Each relies on a single form of damping mechanism to perform the damping function. Each has a pulley and damping mechanism configuration with the damping mechanism external to the pulley. This created an unduly large device for the purpose.

What is needed is a tensioner having a constant tension over a range of linear motion of a pulley. What is needed is a tensioner having a camming body to provide a constant force over a range of spring torque's. What is needed is a tensioner having a damping mechanism comprising a linear guide. The present invention meets these needs.

SUMMARY OF THE INVENTION

The primary aspect of the invention is to provide a tensioner having a constant tension over a range of linear motion of a pulley.

Another aspect of the invention is to provide a tensioner having a camming body to provide a constant force over a range of spring torque's.

Another aspect of the invention is to provide a tensioner having a damping mechanism comprising a linear guide.

Other aspects of the invention will be pointed out or made obvious by the following description of the invention and the accompanying drawings.

The invention comprises a tensioner having a pulley journaled to a housing. The housing further comprises a guide. The guide slidingly engages rails on a base. The guide and rails constrain the housing to move in a predetermined linear path. The rails are horizontally offset from two axis defined by the pulley. The pulley load is also vertically offset from the axis of the guide. The guide and rails have a predetermined frictional coefficient so that the cumulative result is an asymmetric damping effect. Further, a linkage is connected between the housing and a camming body. The camming body is rotatably connected to the base. A biasing member such as a torsion spring biases the camming body against the belt load through the linkage. The radius of the camming body is variable to maintain a constant belt load as the tensioner pulley moves in response to a load change.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
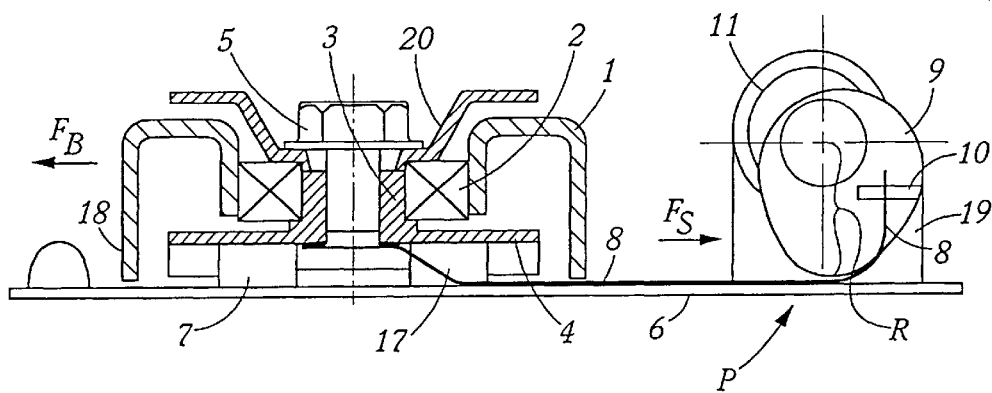
FIG. 1 is a side crosssectional view of the invention.

FIG. 1 is a side cross-sectional view of the invention. The tensioner comprises pulley 1 journaled to housing 3 with bearing 2. Housing 3 further comprises guide 4. Rails 7, 17 are mounted to base 6. Rails 7, 17 slidingly engage guide 4 such that housing 3 is constrained to move in a predetermined path. The path is linear in the preferred embodiment.

One end of linkage 8 is attached to housing 3 and the other end is attached to camming body 9 by fastener 10. Camming body 9 is also connected to torsion spring 11. Torsion spring 11 is connected to base 6. Pivot 13 is attached to base 6. Camming body 9 is rotatably connected to pivot 13, thereby allowing it to rotate about a major axis in response to a torque from spring 11. Linkage 8 is flexible at the end that wraps about camming body 9 during operation.

Camming body 9 further comprises a variable radius. At the no-load position of the tensioner, the radius R at the linkage contact tangent point P is at a minimum. At the maximum tensioner load position, the radius R at P is at a maximum. The difference in radius compensates for the change of spring torque for different positions of the pulley in order to keep the belt tension constant. One can appreciate that the camming body radius can be selected to accommodate a range of belt tension needs of a user.

Figure 2:
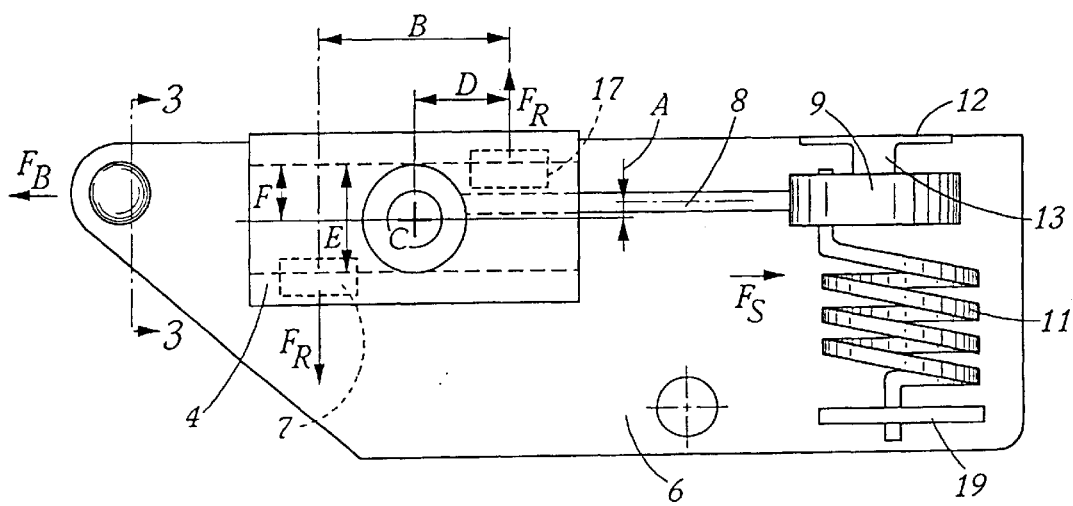
FIG. 2 is a cross-sectional plan view of the invention.

FIG. 2 is a cross-sectional plan view of the invention. A centerline of linkage 8 is offset from the pulley center "C" first axis by displacement "A". Rails 7, 17 are also offset from each other by displacement "B" along a second axis. Rail 17 is offset from the pulley center "C" by displacements "D" and "F". Rails 7, 17 are also offset from each other by displacement "E". Displacement "A" causes reaction forces, $F_R$, at rails 7, 17 on guide 4 to be determined by displacement "B", "D", "E", "F". $F_R$ determines the frictional forces caused by the guide sliding on the rails. The magnitude and the ratio of A, B, D, E, and F determines the damping characteristic created by the action of the guide on the rails. The damping defeats belt oscillations as it operates. It is very beneficial in some cases to have different damping characteristics when the belt is loaded or unloaded. This is known as asymmetricity and can be easily controlled in this design by the ratio between A, B, D, E and F. This relationship is illustrated as follows:

Belt Loaded Condition $$F_{R(17)} - F_{R(7)} = 0$$

$$F_S - \text{Damping}_{(7)}$$

$$-\text{Damping}_{(17)} - F_B = 0$$

$$F_S * A - F_{R(17)} * D - \text{Damping}_{(17)} * F$$

$$+ \text{Damping}_{(7)} * (E - F) - F_{R(7)}$$

$$*(B - D) = 0$$

$$\text{DampingTotal}_I = \text{Damping}_{(7)} + \text{Damping}_{(17)}$$

Belt Unloaded Condition $$F_{R(17)} - F_{R(7)} = 0$$

$$F_S + \text{Damping}_{(7)} + \text{Damping}_{(17)} - F_B = 0$$

$$F_S * A - F_{R(17)} * D + \text{Damping}_{(17)} * F - \text{Damping}_{(7)} * (E-F) - F_{R(7)} * (B-D) = 0$$

$$\text{DampingTotal}_{II} = \text{Damping}_{(7)} + \text{Damping}_{(17)}$$

Asymmetricity of Damping
Asymmetricity=(DampingTotal$_{II}$/DampingTotal$_I$)

In operation, a belt under a tension is trained about system pulleys (not shown), resulting in a belt load $F_B$ being applied to pulley 1. Spring 11 is preloaded to create a spring force $F_S$ that is substantially of equivalent magnitude and opposite direction to belt load $F_B$. Torsion spring 11 resists the load $F_B$ through operation of camming body 9 and linkage 8.

In the preferred embodiment, the linkage is connected to the camming body 9 such that a camming body radius R at a linkage contact tangent point P is at a minimum value for a given belt load $F_B$. Then, for example, as the belt tension decreases or unloads, and hence belt length increases relative to pulley 1, the pulley/housing and guide will move along the rails 7, 17. Operation of the torsion spring on the camming body causes linkage 8 to partially wind about the camming body. In this example, the linkage contact tangent point P on the camming body will move from a lesser radius to a greater radius position, thereby increasing a moment on the linkage to compensate for a corresponding decrease in spring torque caused by the rotation of the camming body. Therefore, the effect of the camming body variable radius causes a constant force to be applied to the housing, even as the housing moves in response to changes in belt load. This causes a constant load to be maintained on the belt over a range of movement of the housing.

Figure 3:
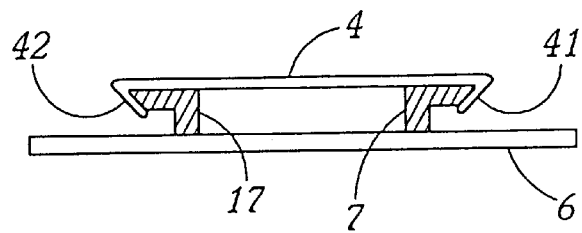
FIG. 3 is a view of the guide and rails as seen in the direction 3—3 in FIG. 2.

Housing 3 is constrained to move along a predetermined path by cooperative operation of guide 4 and rails 7, 17, see FIG. 3. The distance housing 3 moves and the characteristics of its motion are a function of the spring constant and the damping effect of the guide and rails as described herein.

FIG. 3 is a view of the guide and rails at line 3—3 in FIG. 2. Guide 4 comprises inclined sides 41, 42. Rails 7, 17 slidingly engage inclined sides 41, 42 and guide 4 thereby constraining guide 4 and housing 3 to move in a predetermined path. In the preferred embodiment the preferred path is linear along an axis substantially parallel to an axis of the linkage 8. The frictional coefficient of rails 7, 17 and sides 41, 42 may be selected by a user from various materials known in the damping arts, including but not limited to Nylon 6/6 and Nylon 4/6 with lubricant.

Figure 4:
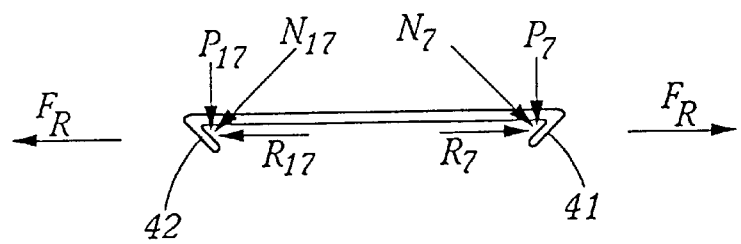
FIG. 4 is a free body diagram of the forces acting on the rails.

FIG. 4 is a free body diagram of the forces acting on the rails. The reaction forces are $F_R$, as described in FIG. 2. The opposing forces from the rails are $R_7$, $R_{17}$. The normal components are $N_7$, $N_{17}$. The pulley forces caused by the belt load are $P_7$, $P_{17}$.

Figure 5:
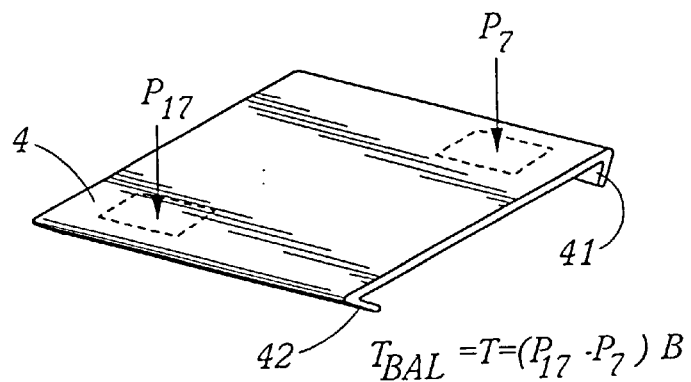
FIG. 5 is a perspective view of the forces acting on the guide.

FIG. 5 is a perspective view of the forces acting on the guide. The balancing torque, $T_{Bal}$, is equal to:

$$T_{Bal} = T = (P_{17} - P_7) * B$$

Although a single form of the invention has been described herein, it will be obvious to those skilled in the art that variations may be made in the construction and relation of parts without departing from the spirit and scope of the invention described herein.

We claim:

1. A tensioner comprising:
    a base;
    a housing;
    a mechanical engagement between the housing and the base, whereby the housing is substantially constrained to move on a predetermined path;
    a linkage connected to the housing and to a camming body, the camming body is rotatably connected to the base;
    a biasing member with an end connected to the base and an other end connected to the camming body;
    the biasing member resisting a rotary movement of the camming body; and
    a pulley journaled to the housing.

2. The tensioner as in claim 1, wherein the camming body further comprises a variable radius.

3. The tensioner as in claim 2, wherein a substantially constant force is applied to the housing at any point in the range of travel of the housing.

4. The tensioner as in claim 3, wherein the mechanical engagement comprises:
    a first and second rail each having a coefficient of friction and mounted to the base;
    a guide having a coefficient of friction mounted to the housing in sliding engagement with the first and second rail.

5. The tensioner as in claim 4 wherein the predetermined path is substantially linear.

6. The tensioner as in claim 5 wherein the biasing member comprises a torsion spring.

7. The tensioner as in claim 6 further comprising:
    the camming body having a variable radius; and
    the linkage connected to the camming body such that a camming body radius R at a linkage contact tangent point is at a minimum at a maximum load.

8. The tensioner as in claim 7, wherein:
    the first rail is offset from a first axis "C" of the pulley by displacements (D) and (F).

9. The tensioner as in claim 8, wherein:
    the first and second rails are offset from each other by a displacement (E).

* * * * *